No. 729,597. PATENTED JUNE 2, 1903.
R. T. JOHNSTON.
ROTARY FOLDING AND DELIVERY MECHANISM.
APPLICATION FILED MAR. 4, 1898. RENEWED OCT. 7, 1902.
NO MODEL. 3 SHEETS—SHEET 1.
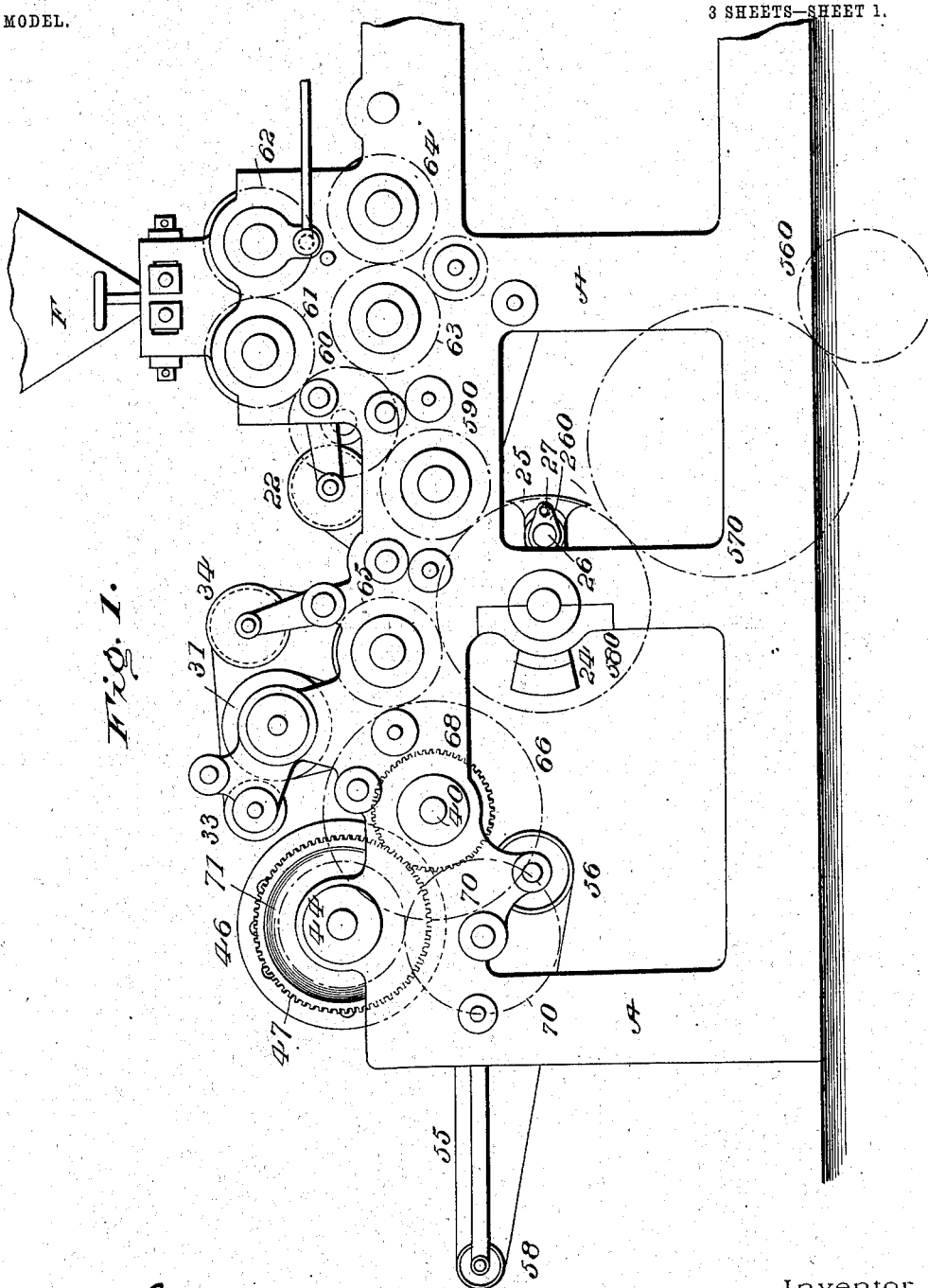
Witnesses.
Inventor.
R. T. Johnston
by Southgate & Southgate
Attorneys No. 729,597. PATENTED JUNE 2, 1903.
R. T. JOHNSTON.
ROTARY FOLDING AND DELIVERY MECHANISM.
APPLICATION FILED MAR. 4, 1898. RENEWED OCT. 7, 1902.
NO MODEL. 3 SHEETS—SHEET 2.
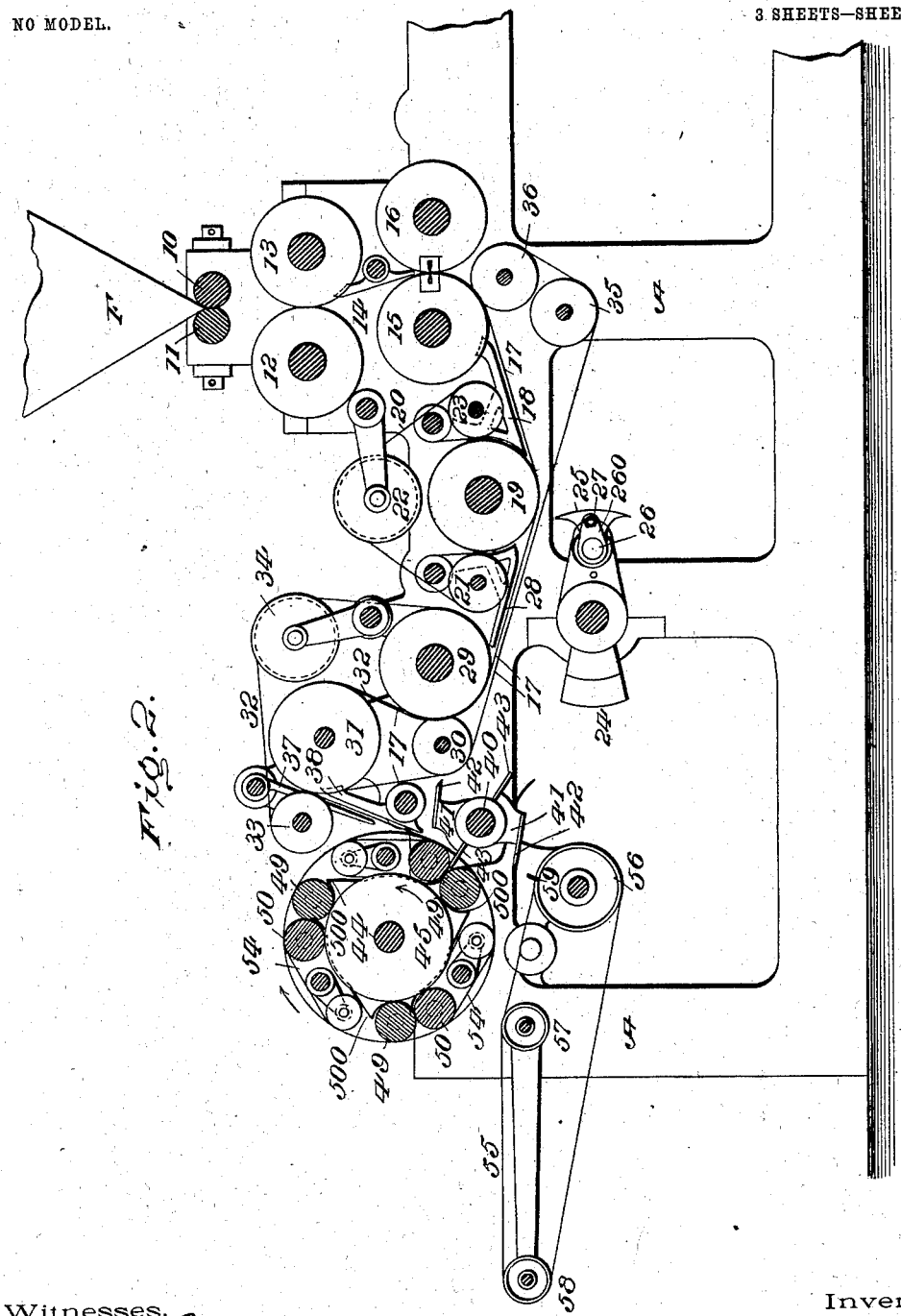
Witnesses.
Inventor.
R. T. Johnston
by Southgate & Southgate
Attorneys

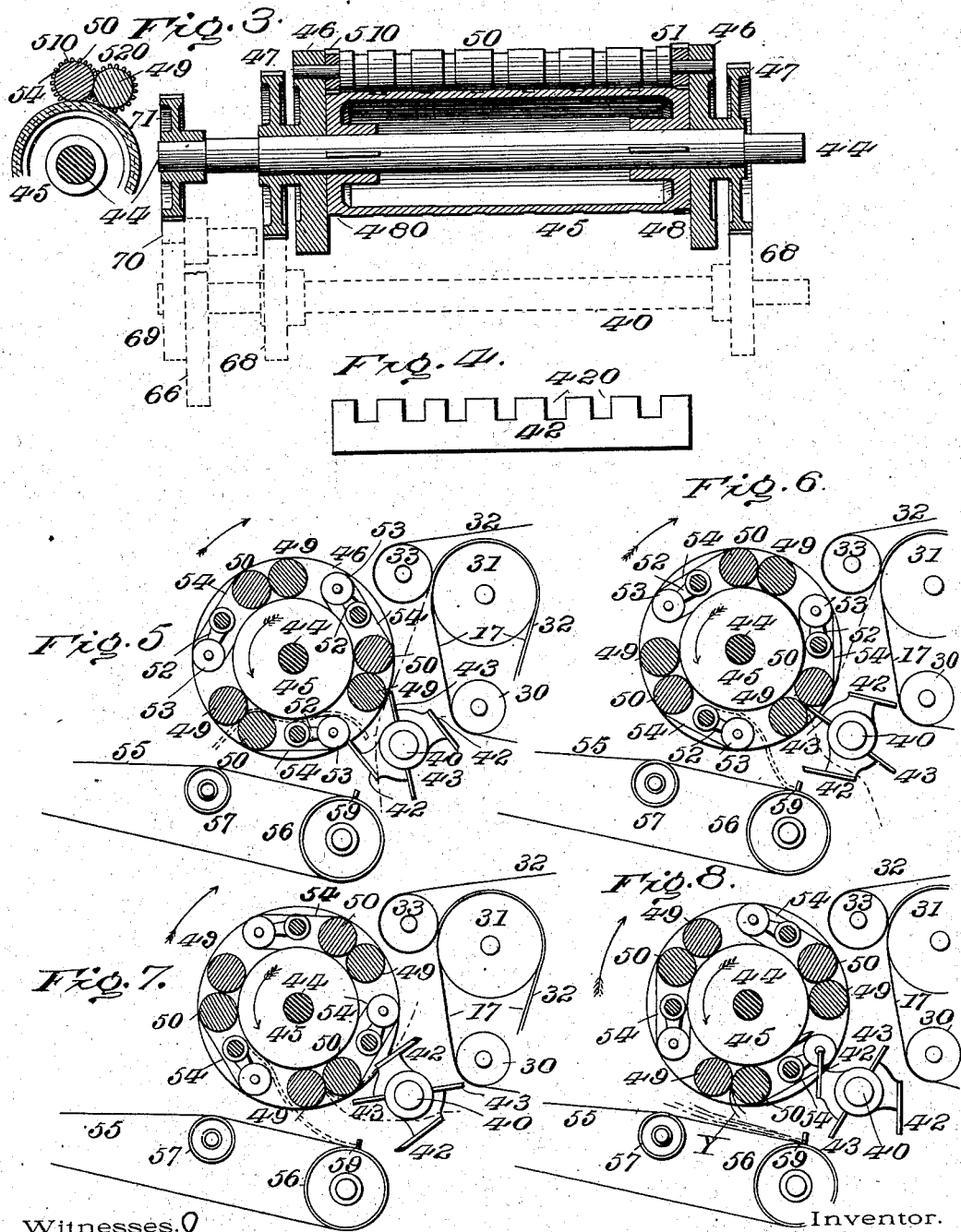

No. 729,597.

Patented June 2, 1903.

UNITED STATES PATENT OFFICE.

ROBERT T. JOHNSTON, OF PLAINFIELD, NEW JERSEY, ASSIGNOR TO CAMPBELL PRINTING PRESS & MANUFACTURING COMPANY, OF NEW YORK, N. Y., A CORPORATION OF NEW YORK.

ROTARY FOLDING AND DELIVERY MECHANISM.

SPECIFICATION forming part of Letters Patent No. 729,597, dated June 2, 1903.

Application filed March 4, 1898. Renewed October 7, 1902. Serial No. 126,370. (No model.)

*To all whom it may concern:*

Be it known that I, ROBERT T. JOHNSTON, a citizen of the United States, residing at Plainfield, in the county of Union and State of New Jersey, have invented a new and useful Rotary Folding and Delivery Mechanism, of which the following is a specification.

The aim of this invention is to provide a rotary folding mechanism which will be very simple and of few parts, accurate in operation, and entirely rotary in action, dispensing preferably with all cams, cranks, &c. I may also use this folding mechanism as a delivering mechanism or as one of a series of folding devices in a folding-machine.

To this end my invention consists of a rotating drum, a pair of folding-rollers, and gearing for rotating the folding-rollers around the rotating drum in opposition to the peripheral movement thereof.

Preferably extending from one of the folding-rollers is a set of tapes which bears on the rotating drum.

Coacting with the folding-rollers is a folding-blade, which in the preferred form of my construction is mounted rigidly on a shaft and is adapted to tuck the sheet into the bite of the folding-rollers simply by its rotation.

I preferably use a plurality of sets of folding-rollers and tapes in combination with one rotating drum, and I further preferably use a plurality of folding-blades mounted on a single shaft. Also turning with the folding blade or blades is a part I call a "controlling-blade."

I preferably use as many controlling-blades as there are folding-blades.

The function of the controlling-blade is to control the free end of the sheet while the same is passing into position to be doubled into the bite of the folding-rollers. This rotating controlling-blade may be used in connection with nearly any rotary folding device.

My invention further consists of certain arrangements and combinations, which are described in this specification and pointed out in the claims annexed hereto.

I have shown in the accompanying drawings my rotary folding mechanism used also as a delivering mechanism and arranged in connection with a folding, cutting, and associating mechanism, although of course my rotary folding mechanism may be used in any desired location.

Referring to the accompanying three sheets of drawings, forming part of this application, Figure 1 is a side elevation of a folding and delivering mechanism in which my rotary folding mechanism is used. Fig. 2 is a sectional elevation just inside the front side frame. Fig. 3 is a longitudinal sectional elevation of my rotary folding mechanism. Fig. 4 is an elevation of one form of controlling-blade that I may use; and Figs. 5 to 8, inclusive, are sectional diagrams illustrating the action of the rotary folding mechanism.

Referring to the drawings and in detail, A A represent the side frames in which the various parts may be journaled or mounted.

F represents a former over which a web or associated webs may be led and folded. The web or webs is or are drawn over the former by means of the folding-rollers 10 and 11 and the drawing-rollers 12 and 13. From the drawing-rollers the folded web or webs is or are directed by a guide 14 into the bite of cutting-cylinders 15 and 16, where the web or webs is or are cut into sheets. From the cutting-cylinders the sheets thus formed pass onto tapes 17 and are directed by the same and by guides 18 to a rotary collecting-cylinder 19. Running around the collecting-cylinder 19 is a set of tapes 20, which also pass around the tape-pulleys 21, 22, and 23, as shown.

I preferably use in connection with the collecting-cylinder a rotary switch of substantially the construction described and claimed in my application for patent filed of even date herewith, Serial No. 672,494. This switch is mounted on a shaft which is rotated, as by gearing hereinafter described. The switch consists of a number of arms 24, each of which has a finger 25, which fingers intermesh with the tapes 17. The fingers 25 are arranged on a shaft 26, carried by the arms 24. Also arranged on this shaft is a lever 260, and a bolt 27 is passed therethrough and tapped into one of the arms 24. By turning the lever 260 one hundred and eighty degrees and securing the same in this position the fingers 25 may be turned into an inoperative position, so that the sheets passing from the cutting-cylinders may be collected or not, as desired. In the particular construction shown the rotary switch is geared to make one turn for every two turns of the collecting-cylinder, so that two of the products passing from the cutting-cylinders may be collected, if so desired. From the collecting-cylinder the product thus formed passes upon the tapes 17 and is guided by suitable guides 28 onto the roller 29. The product then passes up around the roll 29 and between the same and a roll 30, then around a roller 31, and is carried down between the roller 31 and a roller 33. A set of tapes is arranged to run around the rollers 29 31 33 and a set of tightener-pulleys 34, as shown, so that the product will be nicely carried in this pathway and carried down and out between the rollers 31 and 33. The tapes 17 are carried back around the roller 30 and then around rollers 35 and 36 to the cutting-cylinder 15. Suitable guide-fingers, as 37 and 38, are arranged between the rollers 33 and 31, so that the product issuing from between these rollers will be nicely guided down to my rotary folding device.

40 designates a shaft which is journaled in the side frames. Arranged on this shaft are arms 41 41, which carry controlling-blades 42 42. Also secured to these arms are tucker-blades 43 43.

44 designates a shaft, which is journaled in bearings on the side frames, which shaft carries my rotary folding mechanism. A drum 45 is keyed to this shaft 44. Loosely journaled on the shaft 44 on the inside of the framings are plates 46 46, which have gears 47 47, secured to or formed therewith. Also formed or secured to one end of the drum 45 is a gear 48. One or more sets of folding-rollers 49 50 are journaled in the plates 46 46. In the particular examples shown three sets of such folding-rollers are used. Running around the rollers 50 are sets of tapes 54, which bear on the rotating drum 45 and which are passed around tape-rollers 53, secured on arms 52, which arms are adjustably mounted by means of the usual set-screws tapped in the hubs thereof to engage carrying-shafts secured between the plates 46 46. Each roller 50 has a pinion 51 secured to one end thereof, which pinion meshes with the gear 48, secured on the drum 45.

55 designates a set of delivery-tapes, which are arranged under the rotary folding device, and which tapes are led around tape-pulleys 56, 57, and 58, as shown.

59 designates a stop, which is arranged between the frames A A, so that the sheets delivered from the rotary folding mechanism will strike the same.

Suitable gearing is arranged, as hereinafter described, so that the sets of folding-rollers will turn about the rotating drum in opposition to the peripheral movement thereof. One way I may arrange the gearing for operating the various parts of the mechanism described is as follows: 560 designates a pinion, which is driven from any suitable part of the machine. This pinion meshes with an intermediate 570, which in turn meshes with a gear 580, mounted on the shaft of the rotary switch. A gear 590 is mounted on the end of the collecting-cylinder 19 and meshes with the gear 580, so that two products may be collected on the collecting-cylinder, if desired. A suitable intermediate 60 meshes with the gear 590 and with a gear 61, secured to the drawing-roller 12, which gear 61 meshes with a gear 62, secured on the other drawing-roller 13. A gear 63 is secured to the cutting-cylinder 15 and meshes with the intermediate 60 and also with a gear 64, secured to the cutting-cylinder 16. A gear 65 is secured on the end of the cylinder 29 and meshes with the gear 580 of the rotary switch. From this gear 65 the various rolls above the same may be driven by suitable gearing not necessary here to describe. A gear 66 is secured upon the shaft 40, which carries the rotary tucking and controlling blades, which gear 66 meshes with the gear 65. This shaft 40 also carries gears 68 68, which mesh with the gears 47 47, which turn the plates 46 46. Secured on one end of shaft 40 is a gear 69 of the same size as the gears 68. This gear 69 meshes with a suitable intermediate 70, mounted on a suitable stud or shaft journaled in the main frames, and this intermediate 70 meshes with a gear 71, secured on one end of the shaft 44, as shown in Fig. 3. The ratio between the gears 68 and 47 is two to three, so that for every half-revolution of the shaft 40 the plates 46 46 will make one-third of a revolution, and as there are two tucking-blades secured to the shaft 40 and three sets of folding-rollers arranged in the plates 46 46 this gearing will cause a folding-blade to mesh into each set of folding-rollers as the various parts are rotated. The gears 69 and 71 are made the same size.

The folding-rollers 50 carry at their rear ends pinions 510, which clear the drum 45, the drum 45 being recessed, as at 480, for this purpose. These pinions 510 mesh with pinions 520, secured on the rollers 49. The rollers 49 are set so as to just clear the drum 45. As the sets of folding-rollers are revolved around the rotating drum 45 the rollers will be driven by this mechanism at a comparatively higher rate of speed than that at which the rollers are rotated around the drum, and by this means a sheet tucked into the bite of one set of folding-rollers will be carried by the rotating drum 45 and the tapes 54, so as to be delivered; but as this run of the folded sheet takes place the set of folding-rollers will be moved forward, so that the point of delivery of the sheet will be also carried forward around the drum 45, so that the sheets will be delivered against the stop 59 and on the tapes 55, which are run or jogged at a low speed by any of the mechanism in common use for this purpose.

By the gearing before described it will be seen that the folding-rollers make a less number of turns than the rotating drum—that is, considering both the folding-rollers and drum as turning about the shaft 44 as a common axis, for every three revolutions of the driving-shaft 40 the folding-rollers will turn twice about the shaft 44 and the drum 45 with the shaft 44 will turn three times, or, in other words, the necessary way to operate these parts is to give an independent motion of rotation to the rotating drum.

So far as the broad scope of my invention is concerned it is not limited to turning the folding-rollers about the shaft 44 in opposition to the drum 45, for the same result can be obtained by imparting an independent motion of rotation to the folding-rollers which is different from that of the drum, so that there will be a movement of the folding-rollers and tapes relatively to the surface of the drum.

Suitable guides 500 are arranged between the plates 46 46. These guides may be made of the shape shown in Fig. 2. The same will project up between each folding-roller 49 and tape-roller 53, so that the folded sheet issuing from the folding device will not contact with the folding-roller 49 as the same passes out against the stop 59, and these guides 500 bearing tightly on the drum 45 will direct the folded product off of the same. The guides 500 are only shown in Fig. 2 and not in the diagrams for the sake of clearness.

The operation of my improved device may be followed by referring to the sectional diagrams. (Shown in Figs. 5 to 8, inclusive.) In Fig. 5 the sheet or product is shown as passing down from between the rollers 31 and 33, the end as being taken by one controlling-arm 42 (which may be cut away, as shown at 420, to clear the tapes 54) and the end of the sheet as being carried by said controlling-arm 42 to the right. The controlling-arms 42 are connected to the shaft 40 by means of suitable arms or hubs, as shown, so that a space is left between each of said arms and the shaft 40. As the sheets shoot down from between the rollers 31 and 33 the leading end of the same will pass into the space between a controlling-blade and the shaft 40. The controlling-blade will then swing the leading end of the sheet to the right, as shown in Figs. 6 and 7. It will be seen that the controlling-blades 42 are rigidly or immovably connected to their axle or shaft 40 and that a simple mechanism is thus provided for the purpose of controlling the leading end of the sheet, which does not have to be independently actuated outside of its rotation. This action will prevent the end of the sheet from getting stuck or interfering with any of the other parts, a very important point. In Fig. 6 the sheet or product is shown as being tucked by one of the tucking-blades 43 into the bite of the folding-rollers 49 and 50. The sheet will then start up between the bite of the drum 45 and the tapes 54. In Fig. 7 the sheet is shown as running up between the tapes 54 and the drum 45. In Fig. 8 the folded sheet is shown as almost entirely within the bite of the tapes and the rotating drum, and in Figs. 5, 6, and 7 a sheet is shown as being delivered. This delivery will take place at a comparatively slow speed, as the rollers are moving in opposition to the movement by which the folded sheet passes onto the tapes 55. Thus the folding and delivering of the sheets will take place very rapidly.

Of course I may use any number of sets of folding devices rotating about the rotating drum, three being a convenient number to keep the parts properly in continuous operation. This folding device may be used in any desired location, even if the same does not impart the last folds to the product, and the various parts and combinations hereinafter claimed may be used in any location or with any other form of mechanism without departing from the scope of my claims.

Having thus fully described my invention, what I claim, and desire to secure by Letters Patent, is—

1. In a rotary folding mechanism, the combination of a rotating drum, a pair of folding-rollers, gearing for rotating the folding-rollers around the drum in opposition to the peripheral movement thereof, and means for tucking sheets into the bite of the folding-rollers.

2. In a rotary folding mechanism, the combination of a rotating drum, a pair of rollers, tapes passing around one of said rollers and bearing on the drum, gearing for rotating the folding-rollers and tapes around the drum in opposition to the peripheral movement thereof, and means for tucking sheets into the bite of the folding-rollers.

3. In a rotary folding mechanism, the combination of a rotating drum, plates journaled concentrically therewith, a pair of folding-rollers journaled in said plates, gearing for rotating the plates oppositely to the drum, and means for tucking sheets into the bite of the folding-rollers.

4. In a rotary folding mechanism, the combination of a rotating drum, plates journaled concentrically to said drum, a pair of folding-rollers journaled in said plates, tapes passing around one of said rollers and bearing on the drum, gearing for rotating the plates in opposition to said drum, and means for tucking sheets into the bite of the folding-rollers.

5. The combination in a rotary folding mechanism of a rotating drum, a plurality of sets of folding-rollers, gearing for rotating the folding-rollers around the drum in opposition to the peripheral movement thereof, and means for tucking sheets into the bite of the folding-rollers.

6. The combination in a rotary folding mechanism of rotating drums, plates journaled concentrically with said drum, a plurality of sets of folding-rollers journaled in said plates, gearing for rotating the plates oppositely to the drum, and means for tucking sheets into the bite of the folding-rollers.

7. The combination in a rotary folding mechanism of a rotating drum, plates journaled concentrically with said drum, a plurality of sets of folding-rollers journaled in said plates, tapes passing around one of the rollers of each set and bearing on said drum, gearing for rotating the plates oppositely to the drum, and means for tucking sheets into the bite of the folding-rollers.

8. The combination in a rotary folding mechanism of a rotating drum, a pair of folding-rollers, gearing for rotating the folding-rollers around the drum in opposition to the peripheral movement thereof, and a rotating tucker-blade coacting with said folding-rollers.

9. The combination in a rotary folding mechanism, of folding-rollers, a tucker-blade arranged to tuck a sheet into the bite of the folding-rollers, a rotating shaft, and a controlling-blade secured to said shaft, said controlling-blade being arranged to control and manipulate the leading end of the sheet until the same is drawn into the folding-rollers.

10. The combination in a rotary folding mechanism, of a pair of folding-rollers, a rotating shaft carrying a tucker coacting with the folding-rollers, arms mounted on said rotating shaft, and a controlling-blade secured to said arms so as to leave a space between said blade and said shaft, whereby said blade is arranged to control the free end of the sheet or product to be folded.

11. The combination in a rotary folding mechanism of a rotating drum, three sets of folding-rollers, gearing for rotating the folding-rollers around the drum in opposition to the peripheral movement thereof, and a controlling-shaft carrying two tucker-blades.

12. The combination in a rotary folding mechanism of a plurality of sets of folding-rollers, a rotating shaft carrying a plurality of tucker-blades, a plurality of arms, and a plurality of controlling-blades for controlling the free end of the sheet or product to be folded.

13. The combination in a rotary folding mechanism of a rotating drum carrying a gear, a set of folding-rollers, one of which carries a pinion meshing with said gear, gearing for rotating the folding-rollers around the drum in opposition to the peripheral movement thereof, and means for tucking a sheet into the bite of the folding-rollers.

14. The combination in a rotary folding mechanism of a rotating drum, a pair of folding-rollers gearing for rotating the folding-rollers around the drum in opposition to the peripheral movement thereof, the folding-rollers making a less number of turns than the rotating drum, and means for tucking a sheet into the bite of the folding-rollers.

15. The combination in a rotary folding mechanism of a rotating drum, three sets of folding-rollers, gearing for rotating the folding-rollers around the drum in opposition to the peripheral movement thereof, a rotating shaft carrying two tucker-blades coacting with said folding-rollers, and two controlling-blades for controlling the free end of the sheet or product to be folded.

16. The combination in a rotary folding mechanism of a rotating drum, a set of folding-rollers, gearing for rotating the folding-rollers around the rotating drum in opposition to the peripheral movement thereof, delivering devices as a set of tapes for receiving the product from the rotating folding device and delivering the same, and means for tucking a sheet into the bite of the folding-rollers.

17. In a rotary folding-machine, the combination of a drum, folding-rollers, and means for imparting an independent motion of rotation about a common axis to the folding-rollers and to the drum, and means for tucking a sheet into the bite of the folding-rollers.

In testimony whereof I have hereunto set my hand in the presence of two subscribing witnesses.

ROBERT T. JOHNSTON.

Witnesses:
CHAS. W. SPRAGUE,
W. J. KITCHEN.